July 22, 1941.        G. F. TURNER        2,249,872
FASTENING MEANS FOR DETACHABLY SECURING HANDLES TO OPERATING SHAFTS
Original Filed May 1, 1937
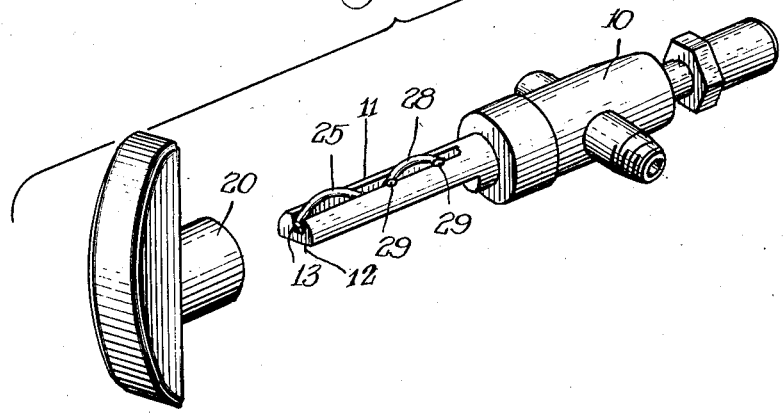
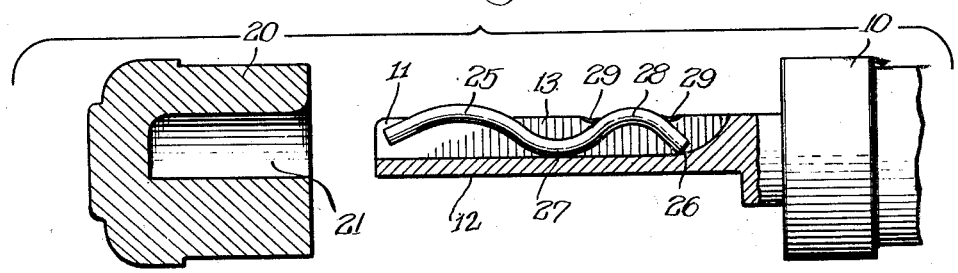
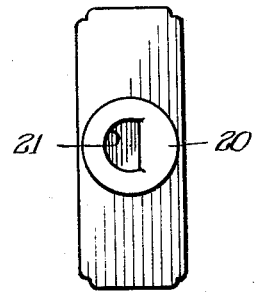
INVENTOR.
George F. Turner,
BY *Wilkinson, Huxley, Byron & Knight*
ATTORNEYS.

Patented July 22, 1941

2,249,872

UNITED STATES PATENT OFFICE 2,249,872

FASTENING MEANS FOR DETACHABLY SECURING HANDLES TO OPERATING SHAFTS

George F. Turner, Chicago, Ill., assignor to Harper-Wyman Company, a corporation of Illinois Original application May 1, 1937, Serial No. 140,105, now Patent No. 2,191,294, dated February 20, 1940. Divided and this application July 3, 1939, Serial No. 282,589

3 Claims. (Cl. 287—53)

This invention relates to a new and improved means for detachably securing a handle to a shaft or stem of the type employed for manually actuating or adjusting various types of devices or instruments. The invention is herein illustrated as applied to the stem and handle of a gas range valve but it will be apparent that the invention may be applied with equal advantage to all similar stems or operating shafts such as those used for radio parts, controls on automobiles and other similar appliances.

It is an object of this invention to provide an improved stem or shaft construction, preferably of non-round cross section, together with a handle therefor having a socket of corresponding shape adapted to fit on the stem or shaft so that the shaft may be readily turned by means of such handle. The shaft is also provided with attaching means which establishes a strong frictional engagement with the inner surface of the handle socket whereby the handle in use is maintained against accidental displacement while at the same time is capable of being removed from the stem by a forced movement in an axial direction and of being applied to the stem of the shaft by an axial thrust in the opposite direction. This invention provides a very convenient and satisfactory means for mounting such operating handles particularly in cases where it is desirable to be able to quickly remove such handles to enable the removal of other parts of the apparatus to which the handle and stem construction is applied.

The present invention is designed to eliminate the difficulties inherent in the devices heretofore used, and to provide a frictional holding means for detachably securing a handle to an operating stem or shaft which will effectively hold the handle against accidental displacement and yet will permit the handle to be readily applied and removed by a forced axial movement. Also, the construction of this invention will permit the handle to be easily applied to the shaft and held with increased frictional resistance as the handle is thrust further onto the shaft into place.

This application is a division of applicant's co-pending application Serial No. 140,105, filed May 1, 1937, now patent No. 2,191,294, of February 20, 1940, entitled Fastening means for detachably securing handles to operating shafts.

The invention is here illustrated as applied to a valve of the type suitable for use on gas ranges and the like and a better understanding of the invention may be had by referring to the illustrative embodiment as disclosed in the accompanying drawing, in which—

Figure 1 is a perspective view of a valve and operating handle embodying attaching means constructed in accordance with this invention.

Figure 2 is a cross sectional view of the stem and handle construction illustrated in Figure 1; and Figure 3 is an end view of the handle shown in Figure 1.

By referring to the drawing, it will be noted that the invention is shown as embodied in a valve 10, having an operating stem 11, which is of non-round cross section and, in this particular instance, is shown as having a D-shaped cross section with the flat surfaces 12 cut on one side and having a groove, as at 13, extending all the way to the outer end of the shaft. This groove may be provided at any point in the circumference of the shaft but is preferably located on the diameter which extends perpendicular to the flat side 12 so that the spring placed therein, as hereinafter described, will urge the flat faces of the operating shaft and the handle socket in tight holding engagement.

The handle may be of any suitable type but as here illustrated comprises a T-shaped member conveniently formed for manual operation and having a hub 20 provided with a socket 21. The socket 21, as shown in Figure 3, is of D-shaped cross section adapted to fit on the operating stem or shaft and be held thereon so that there is no relative rotation between them. The handle may be made of any suitable material, such as molded resins, metal or the like, and when molded from resins the sockets 21 may or may not be provided with a metallic lining.

Furthermore, it is not necessary to provide any depression, groove or any other special means on the inner surface of the socket 21 of the handle as the holding depends only upon the engagement of the spring 25 with the inner surface of the socket.

In this embodiment of the invention, a holding spring 25 is preferably shaped as illustrated, with its rear portion 26 in engagement with the base of groove 13 and with a lower intermediate portion 27 also in engagement with the base of the groove so as to provide a two-point bearing seat for the spring. There is also provided an intermediate raised portion 28 which is tightly engaged by lugs 29 which are peened over as illustrated in Figure 2 and thus serves to hold the spring on its seats 26 and 27 in the bottom of the groove. In this form, the spring is securely held by means of the two-point contact 26—27 and the lugs 29—29. It will be apparent that spring 25 provides a resilient cantilever extending upwardly from the point 27 to provide at its upper surface a frictional spring for engagement with the interior of the surface of the socket 21 of the handle.

The spring 25 may be made of any suitable spring metal but it has been found that very good results are realized when steel wire stock is employed with a cadmium plated surface. The steel gives the proper strength and resilience for the body of the spring and the cadmium plating on the surface provides a smooth, greasy-like surface which permits the handles to be readily applied and removed from the shafts without disturbing the strong frictional holding action required for use.

It will be observed that the construction of this invention provides a bearing contact between the frictional spring and the inner surface of the handle socket over a relatively large area and, in addition, that the holding spring is capable of operating with handles which have some variation in the sockets. It will be apparent that considerable latitude is possible through the selection of different sizes and shapes of wire for the friction spring so that any desired type of friction holding action can be established. Furthermore, the construction has great durability and the spring will not lose its strength or take a permanent set during use.

Finally, the cadmium coating on the wire provides a smooth, lubricated surface which permits the handle to be easily slipped onto and removed from the shaft without impairing the strong frictional holding action established by the spring itself.

Equivalent means may be substituted in the construction of the shaft for the rear portion of the groove 13 and the overhanging lugs 29, as, for instance, the rear portion of the groove may be covered over in a manner to form a recess which may receive and hold the inner portion of the wire member which, due to its arched formation, will be held under initial tension and thus serve as a means mounting the spring wire in the groove. The fundamental of this feature of the invention is that the wire be permanently mounted within the groove of the shaft by virtue of the fact that the same is arched or bowed to a greater extent than will permit its ready accommodation within the recess or space in which it is mounted. The result is that the arched holding portion at the inner end of the spring is thus placed under initial tension, whereby its frictional engagement with the walls of the recess or groove provide an effective frictional action which maintains the spring against accidental displacement.

What is claimed is:

1. A device of the character described, comprising a non-round shaft having a longitudinal groove therein, a wire member disposed in said groove having an arched inner portion and a cantilever spring portion, the arched portion of said spring being supported on the base of the groove and being held at spaced points by lugs extending from the upper edge of said groove and engaging the upper surface of said arched portion, said cantilever spring extending upwardly and outwardly from the bottom of said groove and partially beyond the outer surface of said shaft, whereby to exert a frictional holding action, and a handle having a socket therein adapted to receive said shaft and be frictionally held by said spring.

2. A device of the character described, comprising a non-round shaft having a recess therein, a wire member disposed in said recess having its inner portion arched and held in said recess under initial tension by the confining and holding engagement of opposed portions of the walls of said recess, said wire having a cantilever spring portion extending upwardly and outwardly from said recess and partially beyond the outer surface of said shaft and having its end extending downwardly and terminating within said recess and out of contact with the bottom thereof whereby said spring portion may exert a yielding frictional holding action, and a handle having a socket therein adapted to receive said shaft and be frictionally held by said spring.

3. A device of the character described, comprising a non-round shaft having a longitudinal recess therein, a wire member disposed in said recess having an arched inner portion and a cantilever spring portion, the arched portion of said sprnig being held under initial tension in the inner portion of said recess whereby the same is frictionally bound therein against accidental displacement, said cantilever spring portion extending upwardly and outwardly from said recess and partially beyond the outer surface of said shaft whereby to exert a frictional holding action, and a handle having a socket adapted to receive said shaft and to be frictionally held by said spring.

GEORGE F. TURNER.